US012321370B2

(12) United States Patent
Madisetti et al.

(10) Patent No.: US 12,321,370 B2
(45) Date of Patent: Jun. 3, 2025

(54) METHOD AND SYSTEM FOR MULTI-LEVEL ARTIFICIAL INTELLIGENCE SUPERCOMPUTER DESIGN FEATURING SEQUENCING OF LARGE LANGUAGE MODELS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

(21) Appl. No.: 18/801,421

(22) Filed: Aug. 12, 2024

(65) Prior Publication Data
US 2024/0403338 A1    Dec. 5, 2024

Related U.S. Application Data

(63) Continuation of application No. 18/470,487, filed on Sep. 20, 2023, now Pat. No. 12,147,461, which is a continuation of application No. 18/348,692, filed on Jul. 7, 2023, now Pat. No. 12,001,462.

(60) Provisional application No. 63/469,571, filed on May 30, 2023, provisional application No. 63/463,913, filed on May 4, 2023.

(51) Int. Cl.
  *G06F 16/3329* (2025.01)
  *G06F 40/284* (2020.01)

(52) U.S. Cl.
  CPC ........ *G06F 16/3329* (2019.01); *G06F 40/284* (2020.01)

(58) Field of Classification Search
  CPC .......................... G06F 16/3329; G06F 40/284
  See application file for complete search history.

(56) References Cited

U.S. PATENT DOCUMENTS

| 11,663,201 B2 | 5/2023 | Alakuijala | |
| 11,971,914 B1* | 4/2024 | Watson | ............... G06F 16/3347 |
| 2011/0153744 A1* | 6/2011 | Brown | .................. G06F 40/169 |
| | | | 709/204 |

(Continued)

OTHER PUBLICATIONS

Notice of Allowance received in related U.S. Appl. No. 19/057,610 issued on Apr. 23, 2025; 27 pages.

*Primary Examiner* — Eric Yen
(74) *Attorney, Agent, or Firm* — Daniel C. Pierron; Widerman Malek, PL

(57) ABSTRACT

A method for assigning tasks to h-LLMs including receiving a received prompt, generating derived prompts from the user prompt, generating prompt embeddings from the derived prompts, transmitting the prompt embeddings to a vector database, receiving received knowledge documents from the vector database relevant to the prompt embeddings, generating context-aware tasks responsive to one of the user prompt, the derived prompts, and the received knowledge documents, transmitting each context-aware task an h-LLM configured to specialize in processing tasks having a specialty corresponding to the specialty of the context-aware task, and receiving produced results from the plurality of h-LLMs. At least one of the received prompt or the produced results is processed and transmitted to another h-LLM. New requests are created by the h-LLMs as part of processing the at least one or more of the received prompt and the plurality of produced results.

30 Claims, 19 Drawing Sheets

(56) References Cited

U.S. PATENT DOCUMENTS

| | | | |
|---|---|---|---|
| 2014/0046978 A1* | 2/2014 | Krishnaprasad | G06F 16/2455 |
| | | | 707/781 |
| 2021/0133264 A1 | 5/2021 | Tiwari | |
| 2022/0292266 A1 | 9/2022 | Dey | |
| 2023/0083512 A1* | 3/2023 | Newman | G06N 3/045 |
| | | | 704/9 |
| 2023/0315999 A1* | 10/2023 | Mohammed | G06F 16/345 |
| | | | 704/9 |
| 2023/0316104 A1* | 10/2023 | Ott | G06N 3/048 |
| | | | 706/46 |
| 2024/0126795 A1 | 4/2024 | Zhong | |
| 2024/0202225 A1 | 6/2024 | Siebel | |
| 2024/0281472 A1 | 8/2024 | LaRhette | |
| 2024/0289560 A1* | 8/2024 | Kelly | G06F 16/35 |
| 2024/0320444 A1 | 9/2024 | Maschmeyer | |
| 2024/0330863 A1* | 10/2024 | Hajarnis | G06Q 10/063112 |
| 2024/0346162 A1 | 10/2024 | Luitjens | |
| 2024/0346256 A1 | 10/2024 | Qin | |
| 2024/0354436 A1 | 10/2024 | Mukherjee | |
| 2024/0404632 A1 | 12/2024 | Ho | |
| 2024/0406125 A1 | 12/2024 | Hine | |
| 2024/0412029 A1 | 12/2024 | Yang | |
| 2024/0414108 A1 | 12/2024 | Sun | |
| 2024/0414191 A1 | 12/2024 | Humphrey | |
| 2025/0005293 A1 | 1/2025 | Nguyen | |
| 2025/0077844 A1 | 3/2025 | Lin | |
| 2025/0086394 A1 | 3/2025 | Reddy | |
| 2025/0094703 A1 | 3/2025 | Malak | |

* cited by examiner

METHOD AND SYSTEM FOR MULTI-LEVEL ARTIFICIAL INTELLIGENCE SUPERCOMPUTER DESIGN FEATURING SEQUENCING OF LARGE LANGUAGE MODELS

RELATED APPLICATIONS

This application is a continuation application of and claims priority under 35 U.S.C. § 120 of U.S. patent application Ser. No. 18/470,487 filed on Sep. 20, 2023 and titled Method and System for Multi-Level Artificial Intelligence Supercomputer Design, which in turn is a continuation application of and claims priority under 35 U.S.C. § 120 of U.S. patent application Ser. No. 18/348,692, now U.S. Pat. No. 12,001,462, issued Jun. 4, 2024 filed on Jul. 7, 2023 and titled Method and System for Multi-Level Artificial Intelligence Supercomputer Design, which in turn claims priority under 35 U.S.C. § 119 (e) of U.S. Provisional Patent Application Ser. No. 63/463,913 filed on May 4, 2023 and titled New Tools for Document Analysis in CatchUp and U.S. Provisional Patent Application Ser. No. 63/469,571 filed on May 30, 2023 and titled Multilevel AI PSupercomputer Design. The contents of these applications are incorporated herein by reference.

FIELD OF THE INVENTION

The present invention primarily relates to artificial intelligence and large language models (LLMs) for generative AI applications.

BACKGROUND

Large Language Models (LLMs) are generative Artificial Intelligence (AI) models which are trained on limited amounts of data and can perform language processing tasks (with multimodal inputs-text, and more recently, image inputs as in Microsoft's Kosmos-1) and generate human-like text (and associated multimedia material, like images, video and advertisements). LLMs have many parameters (from millions to billions). LLMs can capture complex patterns in language and produce text that closely resembles human language.

The high-level goal of an LLM is to predict the text (and other multimedia material) that is likely to come next in a sequence. The applicants recognize that LLMs are a type of generative AI that is in usually different from traditional machine learning and AI applications. LLM also stands for Learning with Limited Memory and implies that LLM's are closely tied to their training data and make decisions based on the limited amount of data. Both generative AI and LLM generate content, but LLM does it in a manner that improves computational and memory efficiency.

Traditional machine learning type algorithms focus on analysis, such as statistical regression or clustering, and are usually again different from Generative AI and LLMs, which focus on generating content. LLMs have immediate practical implication in generation of new content that matches associated or preceding/future content in an optimized manner, such as legal briefs or computer code, based on training with a limited amount of data, such as existing briefs or code, both from private and public sources. In this invention, we focus on LLM models as the primary focus of these improvements, though we do not disclaim other AI models, unless expressly done as part of the claims.

LLMs are created with complex architectures such as transformers, encoders and decoders. LLMs, typically, use a technique of natural language processing called Tokenization that involves splitting the input text (and images) and output texts into smaller units called tokens. Tokens can be words, characters, sub-words, or symbols, depending on the type and the size of the model. Tokenization helps to reduce the complexity of text data, making it easier for LLMs to process and understand data thus reducing the computational and memory costs. Another important component of an LLM is Embedding, which is a vector representation of the tokens. The Encoder, within the Transformer architecture, processes the input text and converts it into a sequence of vectors, called embeddings, that represent the meaning and context of each word. The Decoder, within the Transformer architecture, generates the output text by predicting the next word in the sequence, based on the embeddings and the previous words. LLMs use Attention mechanisms that allow the models to focus selectively on the most relevant parts of the input and output texts, depending on the context of the task at hand, thus capturing the long-range dependencies and relationships between words.

LLMs are designed to learn the complexity of the language by being pre-trained on vast amounts of text (and multimedia) data from sources such as Wikipedia, books, articles on the web, social media data and other sources. The training procedure can be decomposed into two stages:
1. Pre-training on a large amount of unlabeled plain text; and
2. Supervised fine-tuning Through training on limited amounts of data, the models are able to learn the statistical relationships between words, phrases, and sentences and other multimedia content. The trained models can then be used for generative AI applications such as Question Answering, Instruction Following, Inferencing, for instance, where an input is given to the model in the form of a prompt and the model is able to generate coherent and contextually relevant responses based on the query in the prompt.

Popular LLM models include GPT (Generative Pre-trained Transformer), BERT (Bidirectional Encoder Representations from Transformers), BART (Bidirectional and Auto-Regressive Transformers) and PaLM (Pathways Language Model). See, for example, public domain websites, such as openai.com or bard.google.com for more information as to how a person of ordinary skill in the art may use these models. Public domain and company-specific LLMs, such as GPT4All, MiniGPT4, RMKV, BERT, MPT-7B, Kosmos-1 (which accepts image and multimodal inputs), YaLM, are also available for wide use, as for example, described in medium.datadriveninvestor.com/list-of-open-source-large-language-models-llms-4eac551bda2e.

Current AI generative models and LLMs require supercomputing efforts to compute results and an efficient way to improve response times, accuracies, and reduce computational load is required to improve both cost and scalability and expandability of existing AI models and their use.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for multi-level generative AI and large language models (LLM) for generative AI applications, that utilize the following techniques:

Derived Requests: An initial level of generative AI software program, or AI broker, evaluates the incoming client request (maybe a conversational query or through an API, such as OpenAI API) and identifies its specific AI "characteristics" that may make it suitable for one or other or both or multiple AI language models and checks its "derived requests" categories to see if the query suits one of the "derived requests" categories and/or it can or should create a new request.

Multiple h-LLMs: If the new request does is not assigned to one or more of the "derived requests) categories, it evaluates the request and selects one or more AI h-LLM model categories for its evaluation. An h-LLM is a family of models, such as GPT-4, that (in addition) have been trained according to a particular training set T1. A family of generative models, LLM1, trained with a data set T1, can be represented as h-LLM1, while a family of models, LLM2, trained with data set T2, can be represented as h-LLM12. Further, a family of models, LLM1, trained with a data set T3, can be represented as h-LLM35. The combination of models and their training sets (T1 could be a subset of T3, for example, or they can be different) may be used in our proposed invention and they are referred to as h-LLMs, throughout. A family of LLMs that operate at a lower arithmetic precision, on computer CPUs or graphical processing units (GPUs, such as Nvidia's H100), may also be called by a different identifier, e.g., h-LLM14, when trained with its corresponding data set.

Choosing h-LLMs with varying levels of accuracy: It further checks the workload of the AI h-LLM models in the one or more categories and its level of training and its accuracy-called its workload scores or its technical accuracy scores, or its business value metrics or a combination of these scores, and then assigns the request (or its derived form) to one or more of the AI h-LLM models within the selected AI h-LLM model categories.

Assigning weights to results: It then receives the results from the AI models in the AI h-LLM models categories and weights them to compute a result that could be returned to the requester program, or it could resend the request back to the AI h-LLM models/categories hierarchy till it reaches a certain level of service level assurance.

Use of Local Database: It also updates a local database with the results of the request's path through its hierarchy and create an index of "derived requests" that may be used in future to select which set of "derived requests" an incoming request may fall into for further processing.

Distributed Architecture: The tasks may be implemented as containers within Kubernetes environment and a service mesh, such as Istio, may be used to instrument and parameterize the metrics and log collections, but not limited to these cloud models for implementation.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
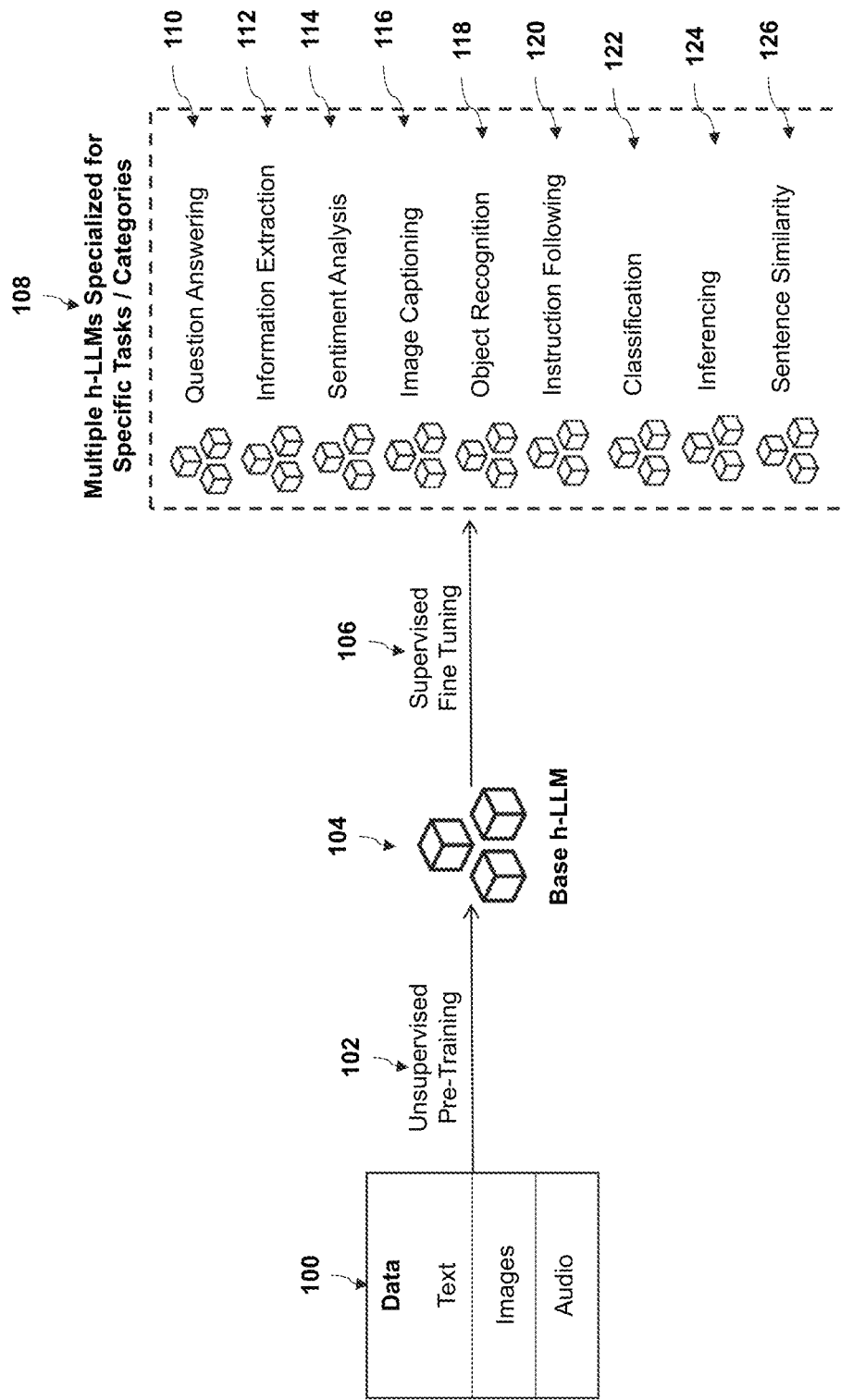
FIG. 1 is an illustration of the training process for creating multiple specialized large language models for specific tasks/categories, according to an embodiment of the present invention.

Referring now to FIG. 1 is an illustration of the training process for creating multiple specialized large language models for specific tasks/categories, is described in more detail. Data 100 (such as text, images, and audio) is used to pre-train a model in a process called unsupervised pre-training 102 which generates a base h-LLM model 104. The pre-training process is referred to as unsupervised as unlabeled data is used at this step. The base h-LLM model 104 is then fine-tuned in a process called supervised fine-tuning 106. The fine-tuning process uses smaller labeled data sets. The base h-LLM model 104 is fine-tuned to generate multiple h-LLM models which are specialized to perform specific tasks such as Question Answering, Information Extraction, Sentiment Analysis, Image Captioning, Object Recognition, Instruction Following, Classification, Inferencing, and Sentence Similarity, for instance.

Figure 2:
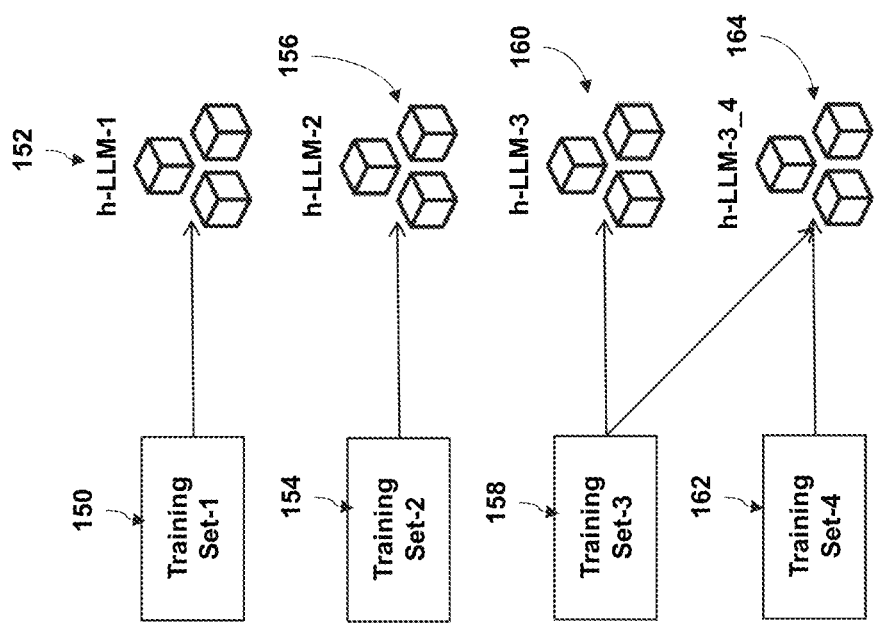
FIG. 2 is an illustration of h-LLMs trained with different training sets, according to an embodiment of the invention.

Referring now to FIG. 2 is an illustration of h-LLMs trained with different training sets, is described in more detail. As used in this specification h-LLM usually refers to a family of LLMs, such as those used in Google's Bard or OpenAI's GPT-4, that have been trained on a particular training set T. Therefore, the same family of LLMs (e.g., GPT) if trained on a different training set, T1, as opposed to GPT trained on training set T2 could be differentiated as a separate h-LLM). The training sets can be private within an organization or public datasets.

For example, as shown in FIG. 2, h-LLM-1 152 is trained with training set-1 150, h-LLM-2 156 is trained with training set-2 154, h-LLM-3 160 is trained with training set-3 158, and h-LLM-3_4 164 is trained with training set-3 158 and training set-4 162.

An h-LLM can be described as a combination of LLM families and the training dataset used as follows:

$h\text{-}LLM = LLM$ family $(X)$ trained with Training Set $(Y)$

Figure 3:
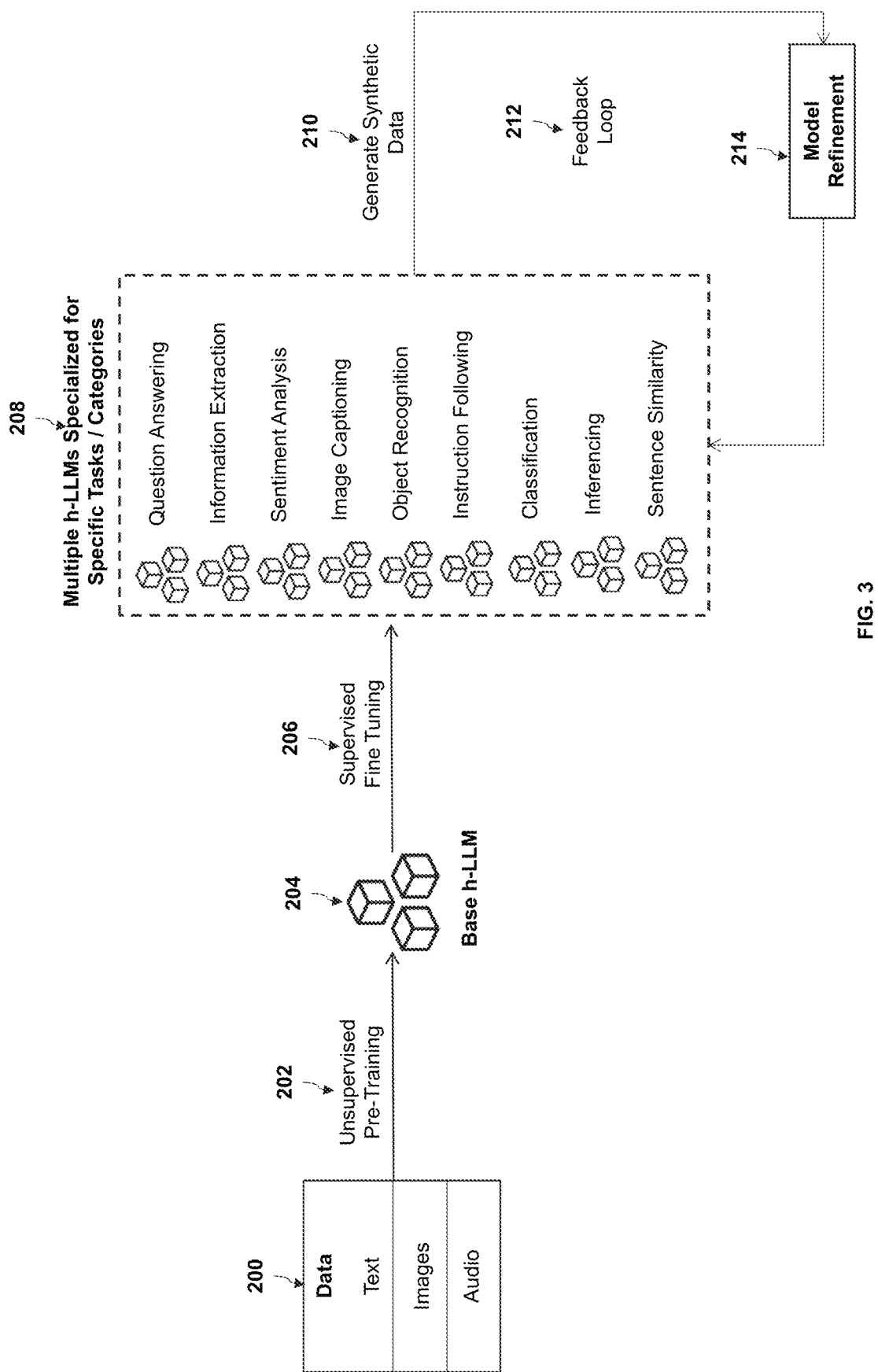
FIG. 3 is an illustration of the process for generating synthetic data from multiple h-LLMs and using it for model refinement, according to an embodiment of the invention.

For example,
h-LLM_1=PaLM-2 may be trained with training set T12
h-LLM_2=PaLM-2 may be trained with training set T12+T45
h-LLM_3=GPT-4 may be trained with Training Set T65
h-LLM_4=GPT-4 may be trained with ANY data set Referring now to FIG. 3, an illustration of the process for generating synthetic data from multiple h-LLMs and using it for model refinement, is described in more detail. Data 200 is used to train a base h-LLM model 204 using unsupervised pre-training 202 which is then fine-tuned in a supervised fine-tuning process 206 to generate multiple h-LLMs specialized for specific tasks or categories 208. Each of these h-LLMs 208 are used to generate synthetic data 210 which is then fed back to the models in feedback loop 212 through a process called model refinement 214.

Figure 4:
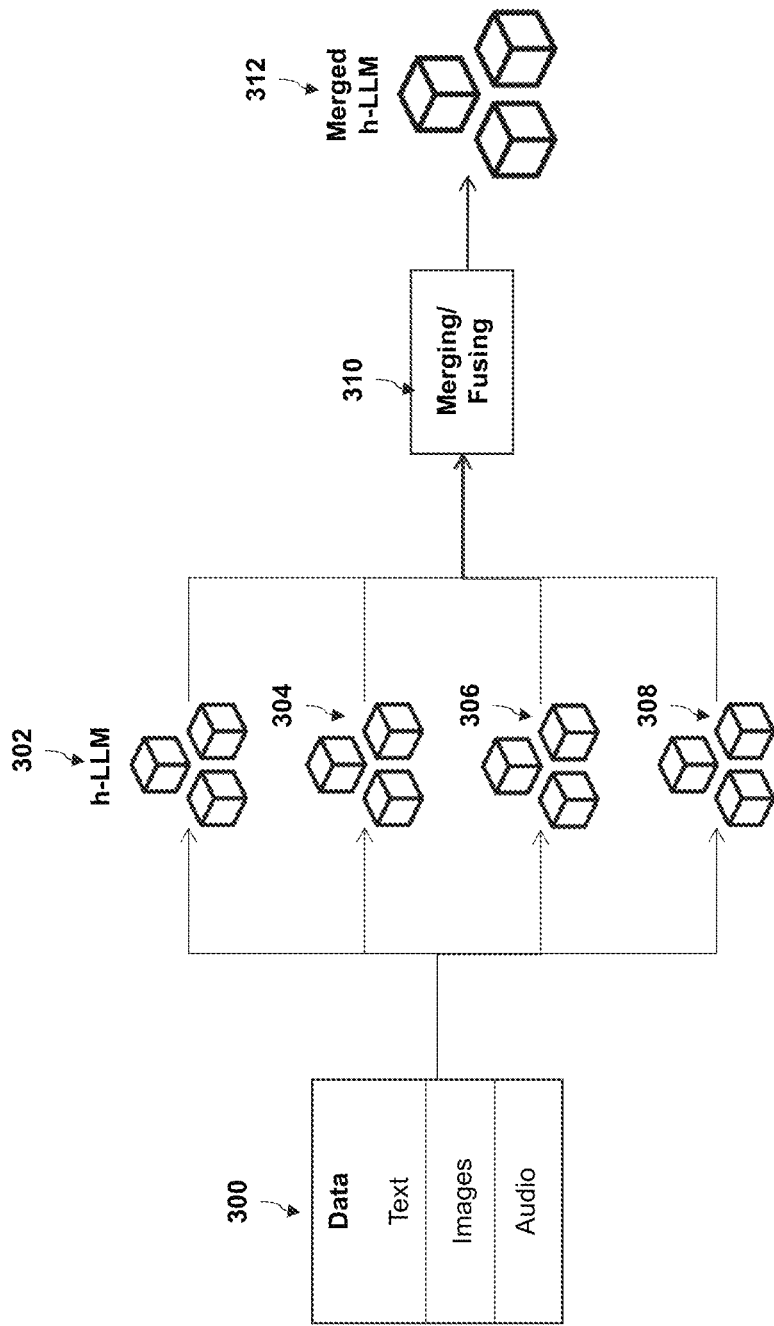
FIG. 4 is an illustration of a "bagging" approach where multiple h-LLMs with lower precision and accuracy are merged/fused to create a merged h-LLM with higher precision and accuracy, according to an embodiment of the invention.

Referring now to FIG. 4 is an illustration of a bagging approach, that has some similarity to what was originally used in the context of machine learning models in a different way (for analytics as opposed to generative AI applications, such as LLMs) that are described in this invention, where multiple h-LLMs with lower precision and accuracy are merged/fused to create a merged h-LLM with higher precision and accuracy, is described in more detail. Bagging is a machine learning technique which improves the stability and accuracy of machine learning models. Using the input data 300, multiple subsets of the data are created which are used to train multiple h-LLMs (302, 304, 306, 308) in parallel. These models are then combined in a process called merging or fusing 310 to create a merged h-LLM 312.

Figure 5:
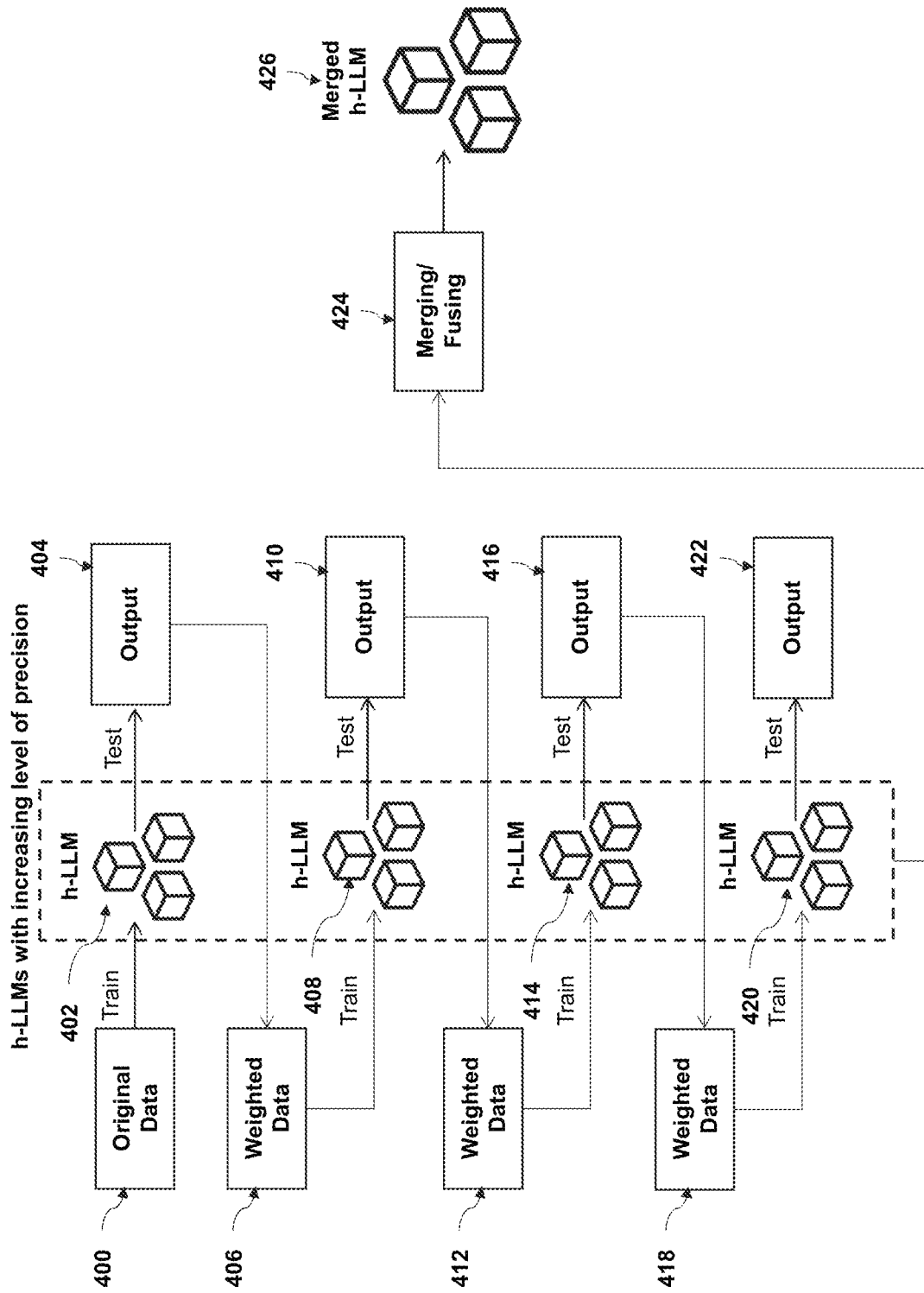
FIG. 5 is an illustration of a "boosting" approach where multiple h-LLMs of increasing precision and accuracy are created in a sequential manner and then merged/fused to create a merged h-LLM, according to an embodiment of the invention.

Referring now to FIG. 5 is an illustration a boosting approach, that has some similarities to that originally used in the context of machine learning models in a different way (for analytics as opposed to generative AI applications used in this invention) where multiple h-LLMs of increasing precision and accuracy are created in a sequential manner and then merged/fused to create a merged h-LLM, is described in more detail. Boosting is a machine learning technique that involves creating a stronger and more accurate model from a number of weaker models. The original data 400 is used to train an h-LLM 402. The h-LLM 402 is tested and the output 404 is assigned weights to generate weighted data 406. The weighted data 406 is then used to train h-LLM 408. The same process is then repeated and h-LLMs 414 and 420 are generated in a sequence. The h-LLMs 402, 408, 414 and 420 are then combined in a process called merging or fusing 424 to create a merged h-LLM 426.

Figure 6:
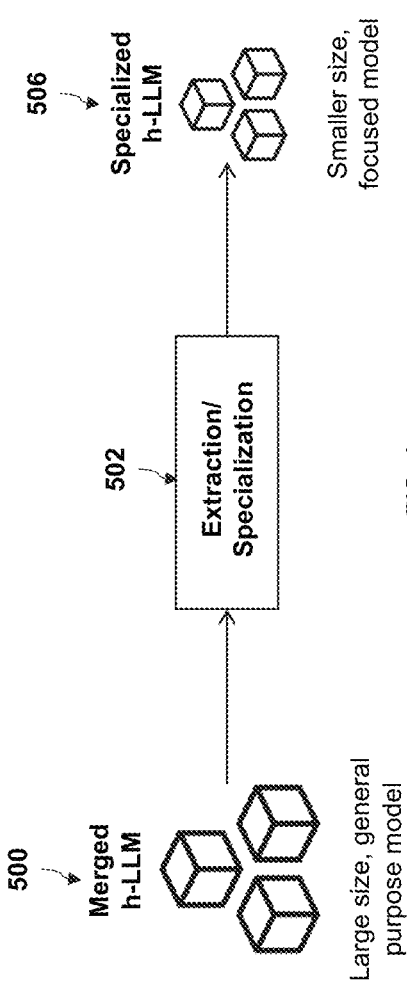
FIG. 6 is an illustration of creating a smaller and more specialized h-LLM through extraction/specialization process from a larger h-LLM, according to an embodiment of the invention.

Referring now to FIG. 6 is an illustration of creating a smaller and more specialized h-LLM through extraction/specialization process from a larger h-LLM, is described in more detail. The extraction/specialization process 502 extracts the specific knowledge required for a task from a big, general-purpose model, and creates a smaller h-LLM 506. For example, a specific task can be sentiment analysis of input text, for which a smaller model 506 is more efficient as compared to a large, general-purpose model.

Figure 7:
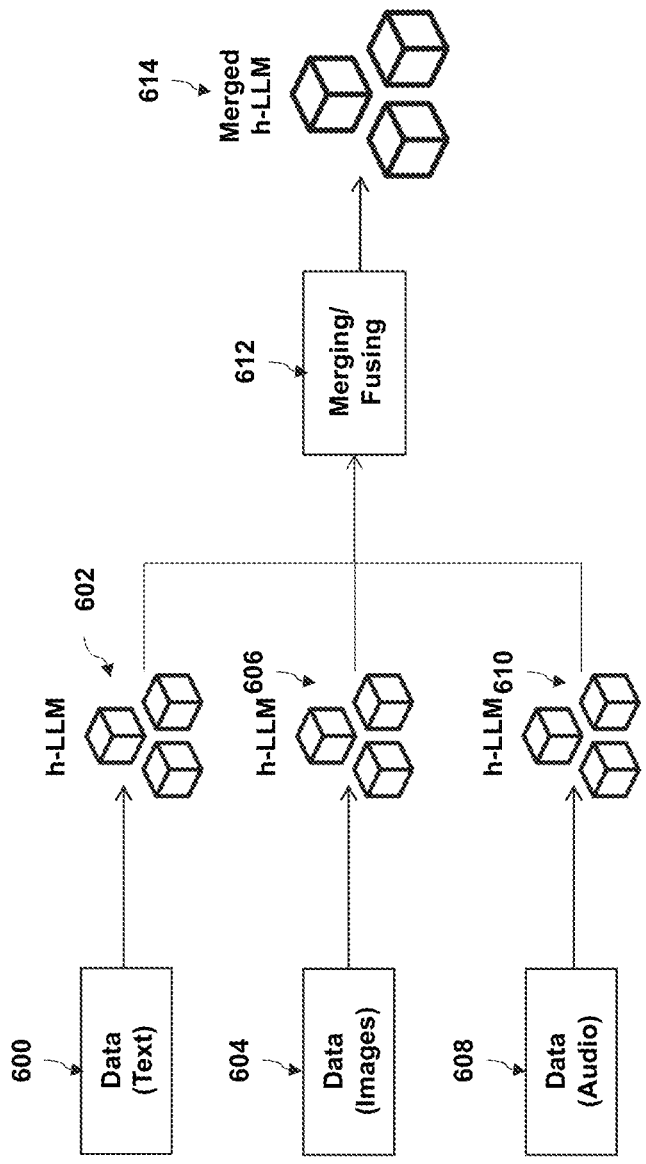
FIG. 7 is an illustration of combining h-LLMs trained with text, image and audio data to create a merged h-LLM, according to an embodiment of the invention.

Referring now to FIG. 7 is an illustration of combining h-LLMs trained with text, image and audio data to create a merged h-LLM, is described in more detail. Text data 600 is used to train h-LLM 602, image data 604 is used to train h-LLM 606 and audio data 608 is used to train h-LLM 610. The h-LLMs 602, 604, 608 are combined in a process called merging/fusing to create a merged h-LLM 614.

Figure 8:
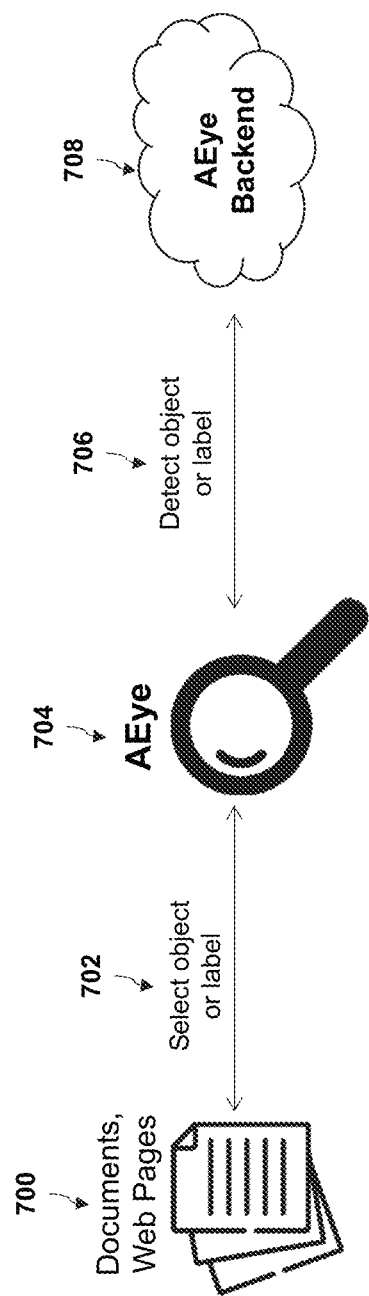
FIG. 8 is an exemplary illustration of an application of using AI models for detecting labels in PDF files, according to an embodiment of the invention.

Referring now to FIG. 8 is an exemplary illustration of an application of using AI models for detecting labels in PDF files, is described in more detail. Patent documents (such as PDF files) have figures in which various entities/blocks/items are labeled using numeric labels (for instance 110, 120 and so on). These labels are referenced and described in the patent text specification. When reviewing multiple documents, readers find it difficult to quickly lookup the labels mentioned in the figures (and what they refer to) from the text, as they need to go back and forth between a figure and the text in the specification. A novel PDF Label search solution is offered within CatchUp which allows quick lookup of labels in a figure using an innovative "AI Magnifier" approach. The user can select one or more labels using the Magnifier tool in the CatchUp GlassViewer (a PDF viewer tool within CatchUp that has annotation and other AI features). When one or more labels are selected using the Magnifier tool, the labels are searched within the PDF and the search results are returned. The PDF Label Search tool is built upon a novel AI Magnifier technology (which we refer to as AEye). AEye serves as a gateway to the world of Artificial Intelligence (AI) for documents and web pages. AEye can be used for a wide range of applications such as detecting objects in images, labels in documents, for instance. Documents or web pages 700 can be searched using an AEye application 704 which detects objects or labels utilizing an AEye backend 708.

Figure 9:
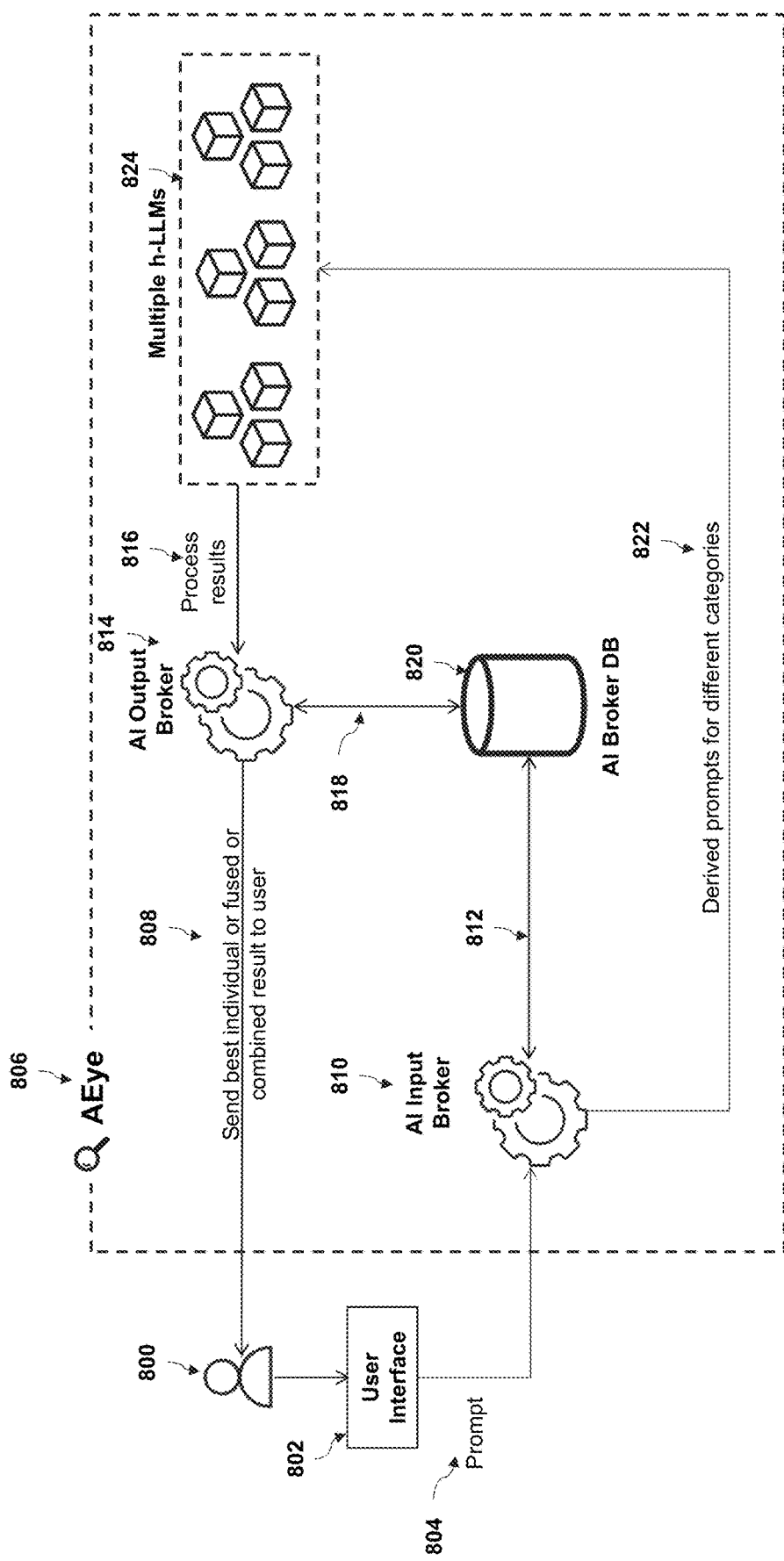
FIG. 9 is an illustration of generating derived prompts for different categories and using them with multiple h-LLMs to generate the best results, according to an embodiment of the present invention.

Referring now to FIG. 9 is an illustration of generating derived prompts for different categories and using them with multiple h-LLMs to generate the best results, is described in more detail. User 800 enters a prompt in user interface 802. The prompt is sent to the AI Input Broker 810 which generates multiple derived prompts for different categories. The derived prompts 822 are sent multiple h-LLMs 824 which produce the results. The results 816 are sent to the AI Output Broker 814 which processes the results and performs tasks such as filtering, ranking, weighting, assigning priorities, and then sends the best results to the user 800. The h-LLMs 824 can have varying levels of accuracy, and optimized for different tasks such as Question Answering, Information Extraction, Sentiment Analysis, Image Captioning, Object Recognition, Instruction Following, Classification, Inferencing, and Sentence Similarity, for instance. The AI Output Broker 814 computes various scores and assigns weights for ranking the results. The results may be sent back to the h-LLMs till a certain level of accuracy or service level assurance is reached. The AI Input Broker 810 and Output Broker 814 update a local AI Broker Database 820 with the results of the request's path through its hierarchy and create an index of "derived requests" that may be used in future to select which set of "derived requests" an incoming request may fall into for further processing.

Figure 10:
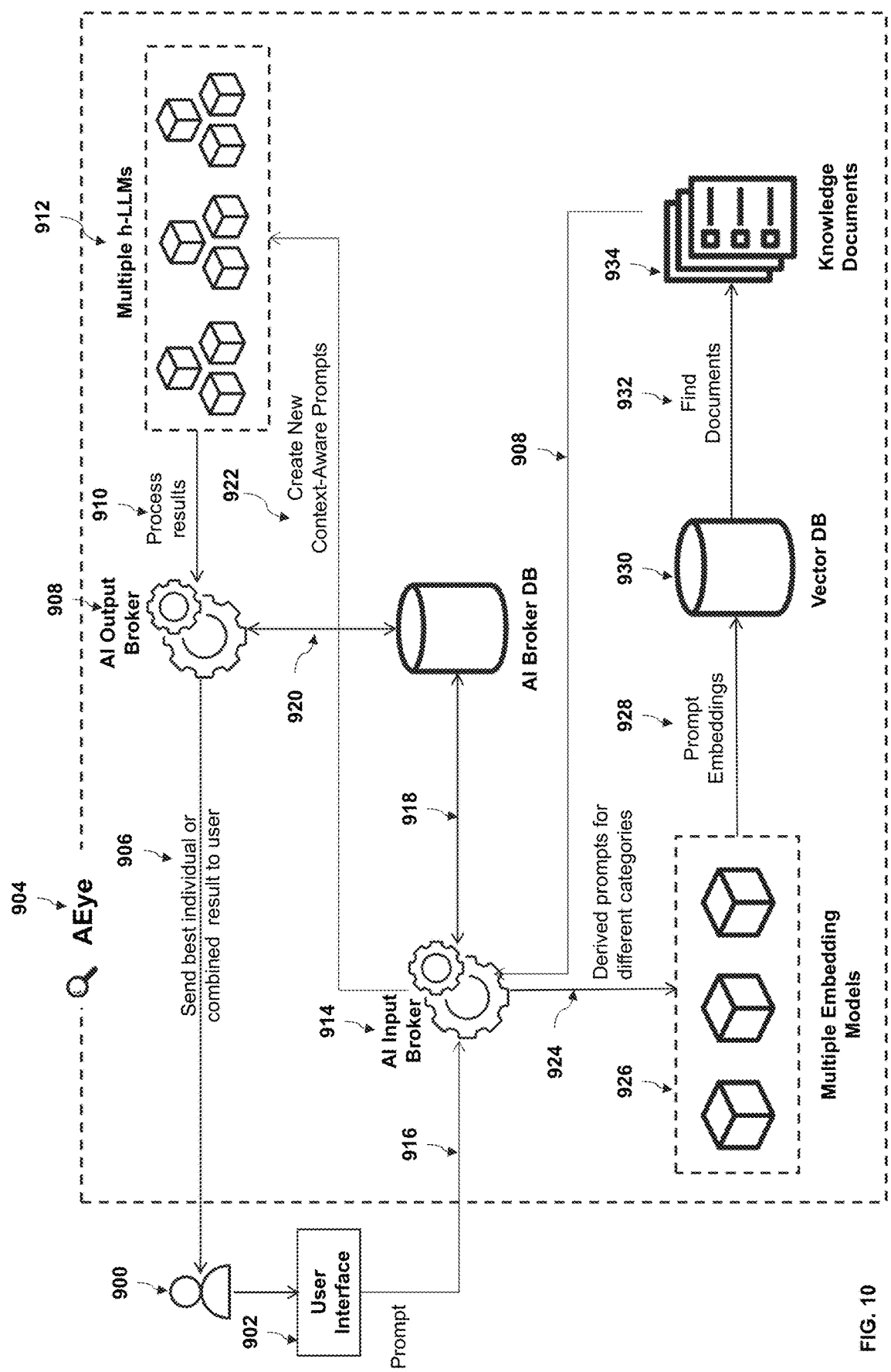
FIG. 10 is an illustration of using multiple h-LLMs to answer questions from specific input documents, according to an embodiment of the present invention.

Referring now to FIG. 10 is an illustration of using multiple h-LLMs to answer questions from specific input documents, is described in more detail. User 900 enters a prompt in user interface 902. The prompt is sent to AI Input Broker 810 which generates multiple derived prompts for different categories 924. The prompts are converted into embeddings using multiple embedding models 926. The prompt embeddings 928 are sent to a vector database 930 which returns a list of knowledge documents 934 that are relevant to the prompt based on the similarity of their embeddings to the user's prompt. The knowledge documents 934 are sent to the AI Input Broker 810 which creates new context-aware prompts based on the user's initial prompt 916, derived prompts 924 and the retrieved knowledge documents 934 as context and sends it to multiple h-LLMs 912. The results produced by multiple h-LLMs are processed by the AI Output Broker 908 and the best result is sent to the user 900 along with citations from the knowledge documents 934.

Figure 11:
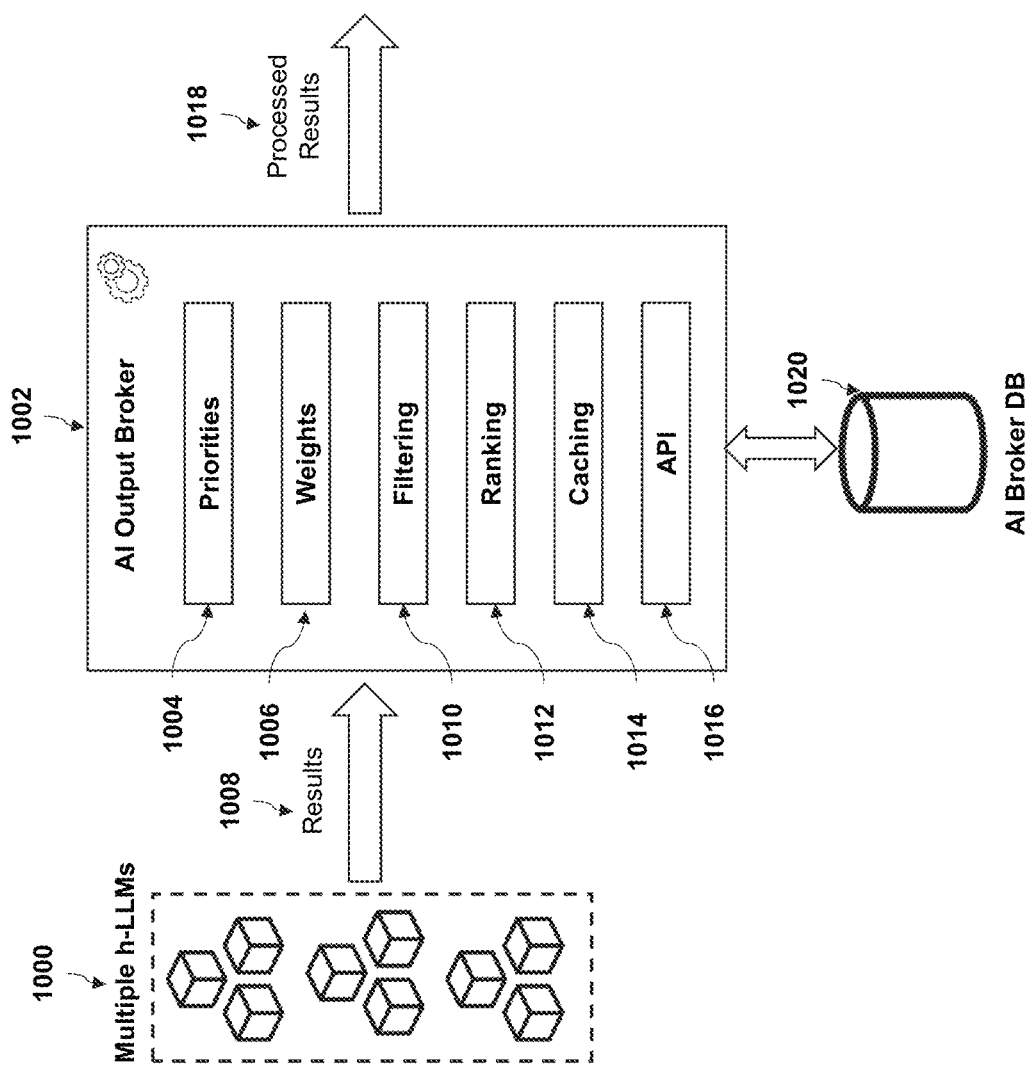
FIG. 11 is an illustration of an AI Broker for processing results from multiple h-LLMs, according to an embodiment of the present invention.

Referring now to FIG. 11 is an illustration of an AI Broker for processing results from multiple h-LLMs, is described in more detail. Results produced by multiple h-LLMs 1000 are sent to an AI Output Broker 1002 which performs tasks such as assigning priorities 1004 and weights 1006 to the results, filtering 1010, ranking 1012 and caching 1014. The AI Output Broker 1002 provides an API interface 1016 for configuring and managing various aspects of the broker. An AI Broker Database 1020 stores the results along with the meta-data information such as the request path. AI Broker Database 1020 creates an index of "derived requests" that may be used in future to select which set of "derived requests" an incoming request may fall into for further processing.

Figure 12:
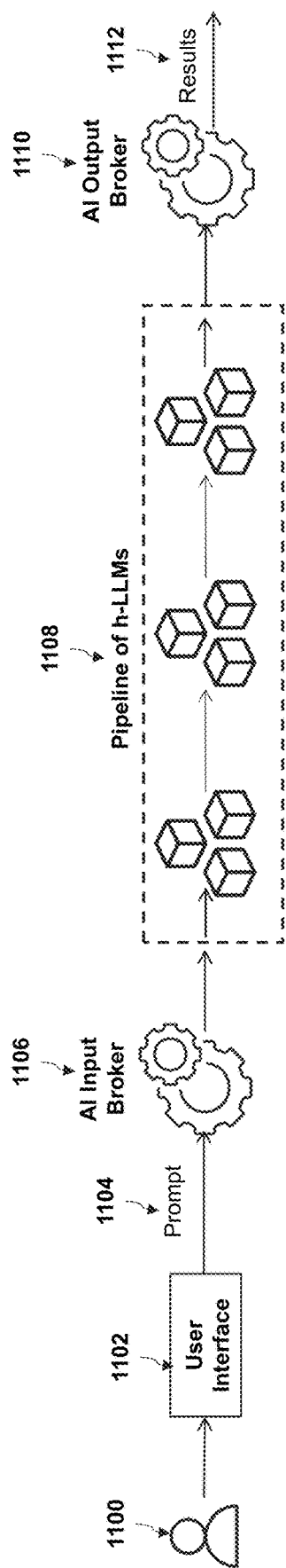
FIG. 12 is an illustration of the combining h-LLMs in series, according to an embodiment of the present invention.

Referring now to FIG. 12 is an illustration of the combining h-LLMs in series, is described in more detail. User 1100 enters a prompt in user interface 1102. The prompt 1104 is sent to an AI Input Broker 1106 which generates a derived prompt by adding more contextual information. The derived prompt is sent to multiple h-LLMs 1108 connected in series. The derived prompt goes to the first h-LLM in the sequence which generates results. The results of the first h-LLM are sent to the second h-LLM in the sequence for refinement/enhancement and then to the third h-LLM and so on. The AI Output Broker 1110 processes the results 1112 and sends the processed results to user 1200.

Figure 13:
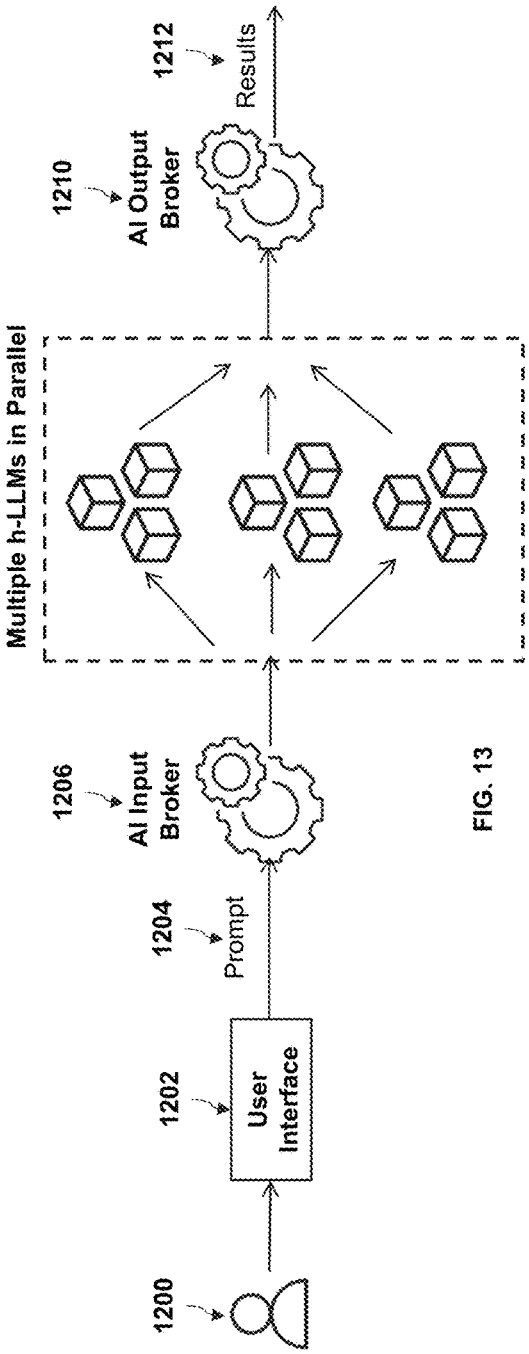
FIG. 13 is an illustration of combining h-LLMs in parallel, according to an embodiment of the present invention.

Referring now to FIG. 13 is an illustration of combining h-LLMs in parallel, is described in more detail. User 1200 enters a prompt in user interface 1202. The prompt 1204 is sent to an AI Input Broker 1206 which generates multiple derived prompts by adding more contextual information. The derived prompts are sent to multiple h-LLMs 1208 which process the prompt in parallel generating multiple results. The AI Output Broker 1210 processes the results and sends the processed results 1212 to the user 1200.

Figure 14:
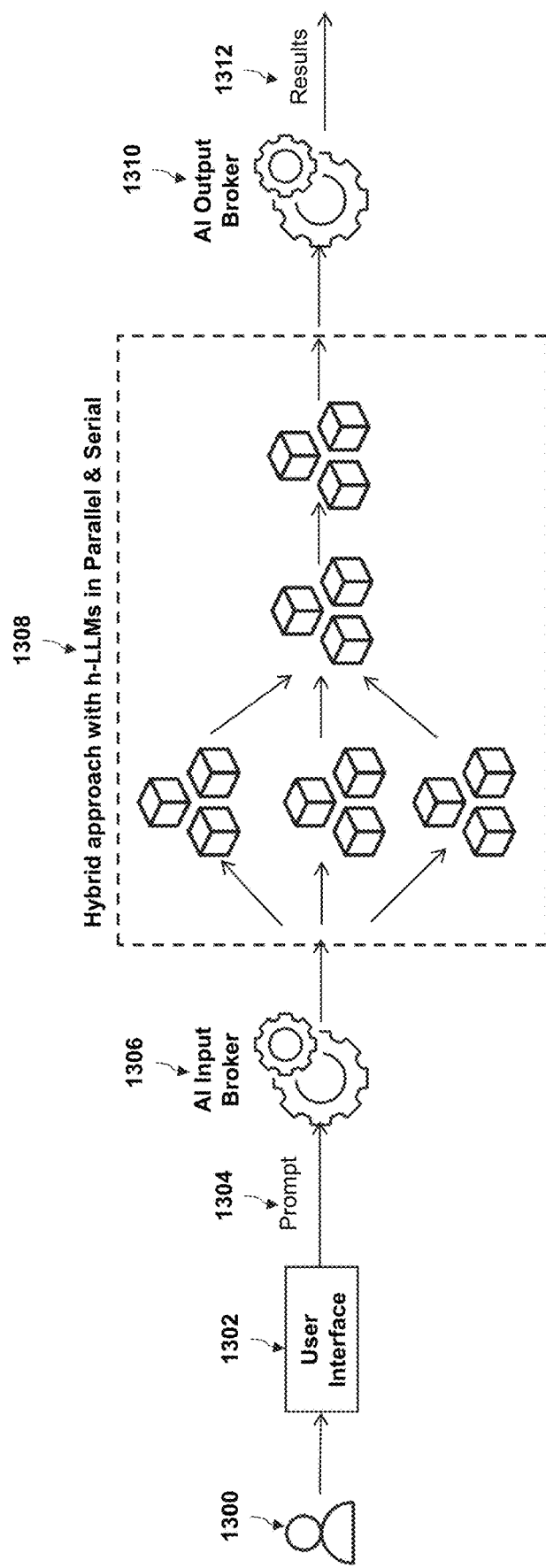
FIG. 14 is an illustration of a hybrid approach of combining h-LLMs in series and parallel, according to an embodiment of the present invention.

Referring now to FIG. 14 is an illustration of a hybrid approach of combining h-LLM in series and parallel, is described in more detail. User 1300 enters a prompt in user interface 1302. The prompt 1304 is sent to an AI Input Broker 1306 which generates multiple derived prompts by adding more contextual information. The derived prompts are sent to multiple h-LLMs 1308 which processes the prompts generating one or more results. The AI Output Broker 1310 processes the results and sends the processed results 1312 to the user 1300.

Figure 15:
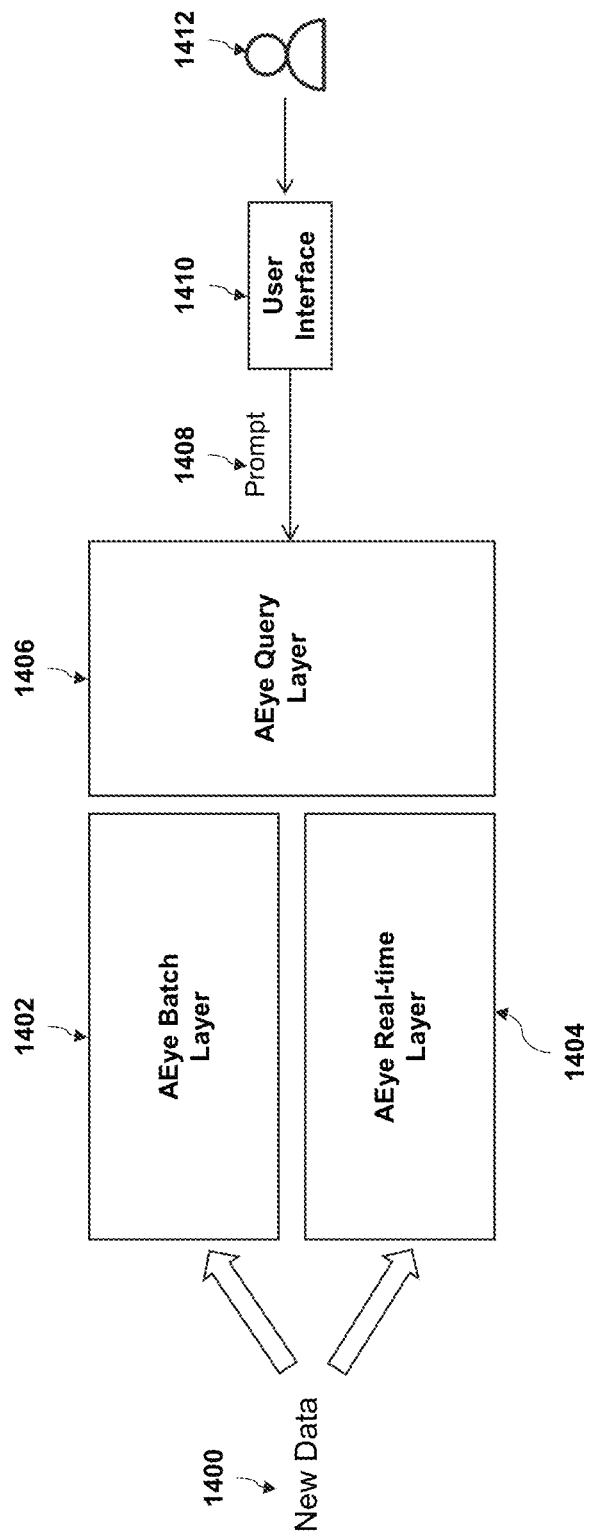
FIG. 15 is an illustration of the lambda architecture for h-LLMs, according to an embodiment of the present invention.

Referring now to FIG. 15 is an illustration of the lambda architecture for h-LLMs, is described in more detail. Lambda architecture is a way of processing massive quantities of data that provides access to batch-processing and stream-processing methods with a hybrid approach, often utilizing in-memory storage instead of disks for speedier processing. Such in-memory processing may be accomplished using a volatile memory device such as random-access memory (RAM) devices, static random-access memory (SRAM) devices, dynamics random-access memory (DRAM) devices, magnetoresistive random-access memory (MRAM) devices, and the like, or a non-volatile random-access memory (NVRAM) device. Such processing may be done partially or entirely in-memory.

This figure illustrates a lambda architecture for h-LLMs comprising batch layer 1402, real-time layer 1404 and a query layer 1406. New input data 1400 comes in continuously and is fed to the batch layer 1402 and real-time layer 1404 simultaneously. The batch layer 1402 maintains one or more h-LLMs which are updated/fine-tuned with the new data on a fixed schedule. Data is aggregated from the new input data 1400 over an aggregation duration that is tied to the fixed schedule. The real-time layer 1404 deals only with recent data which is not processed in the batch layer. The real-time layer 1404 maintains and updates smaller h-LLMs with incremental updates. The real-time layer 1404, also utilizes Map Reduce type analytics and computing and processing (See for example, tutorialspoint.com/map_reduce/map_reduce_introduction.htm) of tokens in the tokenization processes to improve speeds by which tokens are merged or otherwise aggregated in a distributed GPU computing environment, User 1412 sends a prompt 1408 through user interface 1410 to the query layer 1406. The query layer 1406 forwards the original prompt or creates one or more derived prompts which are sent to the batch and real-time layers. The query layer receives the results from the batch and real-time layers and performs tasks such as combining, ranking, filtering, assigning weights and priorities to the results and sends the best results to the user.

Figures 16, 17:
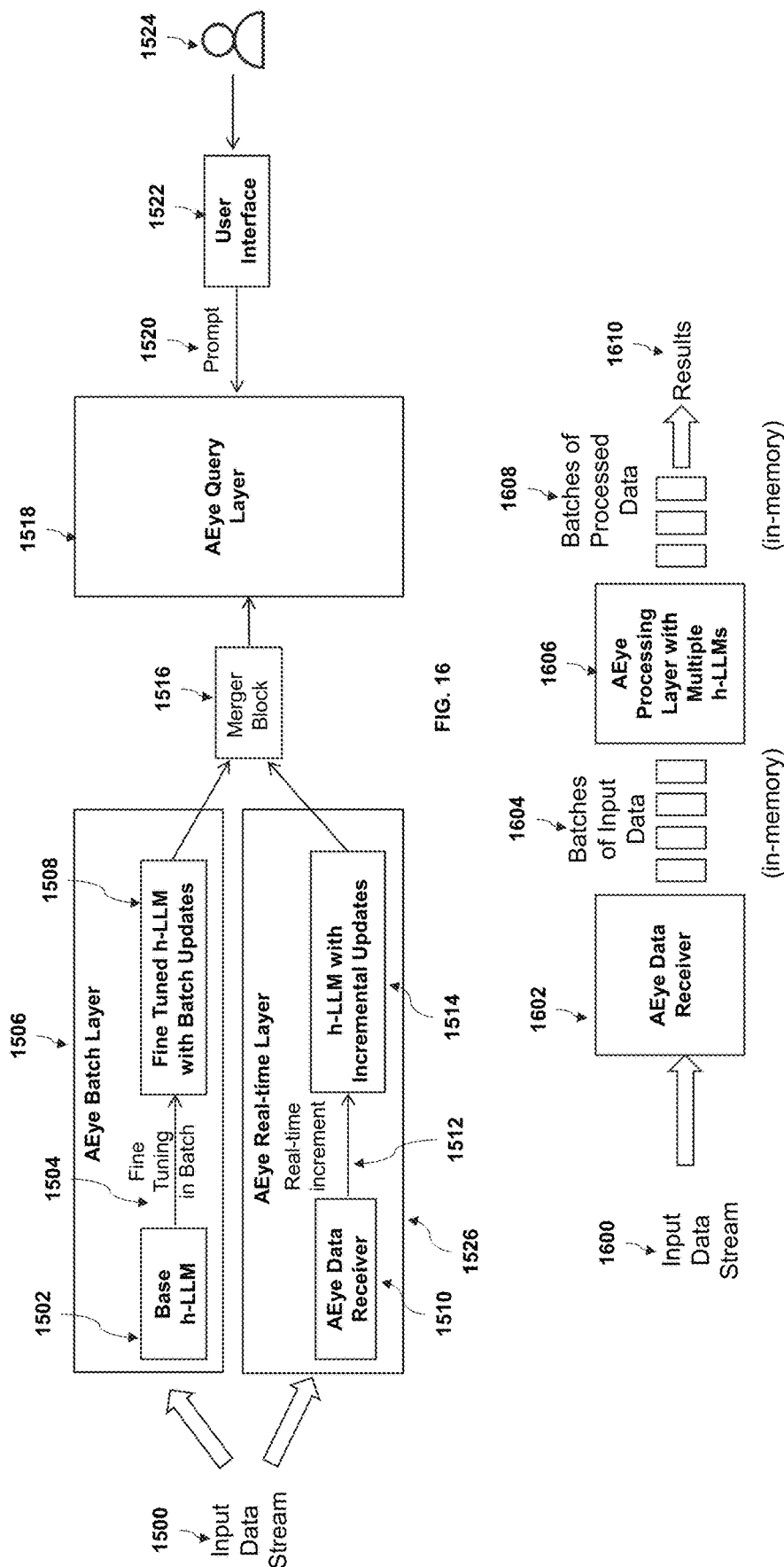
FIG. 16 is an illustration of batch and real-time processing architecture for h-LLMs, according to an embodiment of the present invention.
FIG. 17 is an illustration of an in-memory processing architecture for h-LLMs, according to an embodiment of the present invention.

Referring now to FIG. 16 is an illustration of batch and real-time processing architecture for h-LLMs, is described in more detail. The input data stream 1500 is sent to batch layer 1506 and real-time layer 1526. The batch layer 1506 maintains a base h-LLM 1502 which is fine tuned 1504 in batch to generate fine-tuned h-LLM 1508. The real-time layer 1526 generates smaller h-LLMs with incremental updates 1514 in real-time increments 1512. The merger block 1516 combines and merges the h-LLMs from the batch layer and real-time layer to produce a combined h-LLM. The merged h-LLM is used with the query layer 1518 to respond to prompts 1520 sent by user 1524 through the user interface 1522.

Referring now to FIG. 17, an illustration of an in-memory processing architecture for h-LLMs, is described in more detail. The input data stream 1600 is sent to the data receiver 1602 which breaks the data into small batches 1604 which can be processed at least partially, and in some embodiments entirely, in-memory. The processing layer 1606 includes multiple h-LLMs which process the batches on input data and produce the batches of processed data 1608. Such batches may be produced after aggregating data from the input data stream 1600 over an aggregation duration.

Figure 18:
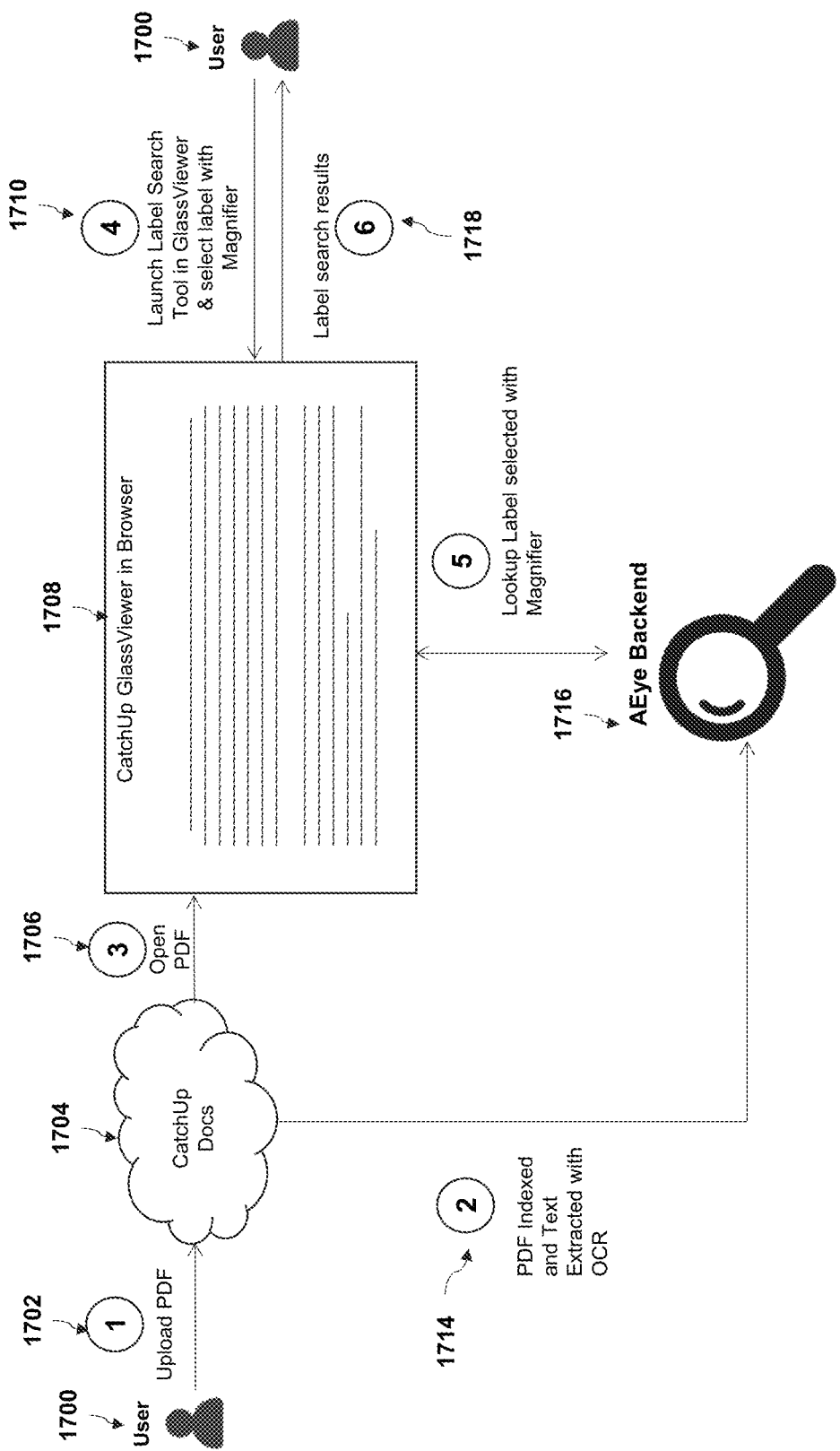
FIG. 18 is an illustration of the architecture of PDF label search tool with CatchUp GlassViewer, according to an embodiment of the invention.

Referring now to FIG. 18 is an illustration of the architecture of PDF label search tool with CatchUp GlassViewer, is described in more detail. User 1700 uploads a PDF document 1702 to the CatchUp document management system 1704. The text of the PDF document is extracted and indexed 1714 in the AEye backend system 1716. Such extraction and indexing may be performed using character recognition analysis, including optical character recognition analysis. The user opens the PDF document 1706 with the CatchUp GlassViewer application 1708 in a browser. User 1700 launches the label search tool 1710 within the CatchUp GlassViewer application 1708 and selects a label using the magnifier tool. The selected label is sent to the AEye backend system 1716 which retrieves and returns 1718 all occurrences of the label.

Figure 19:
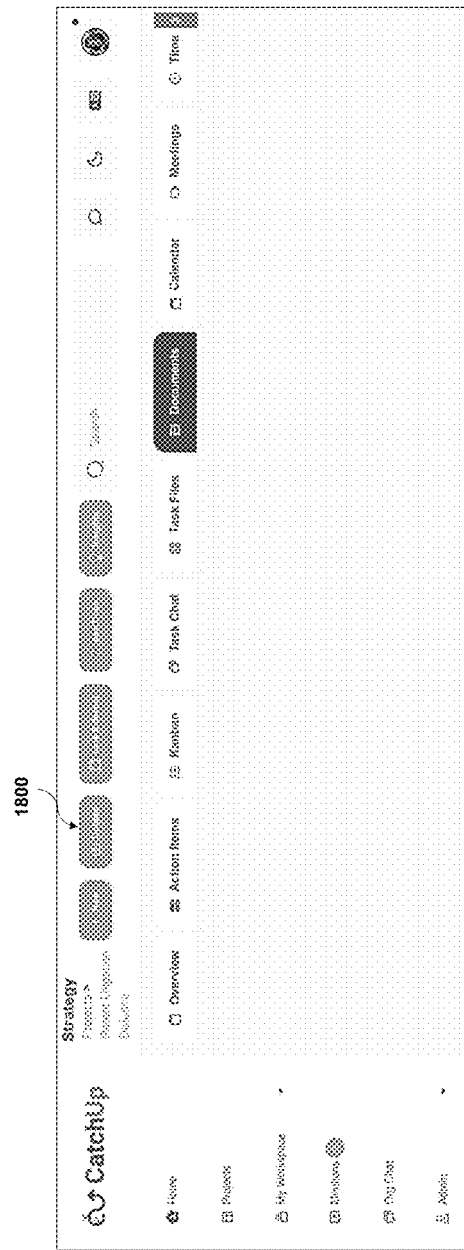
FIG. 19 is an exemplary interface of the CatchUp platform showing the document management system, according to an embodiment of the invention.

Referring now to FIG. 19 is an exemplary interface 1800 of the CatchUp platform showing the document management system, is described in more detail. Within this interface users can create new documents, upload existing documents, view and edit the documents.

Figure 20:
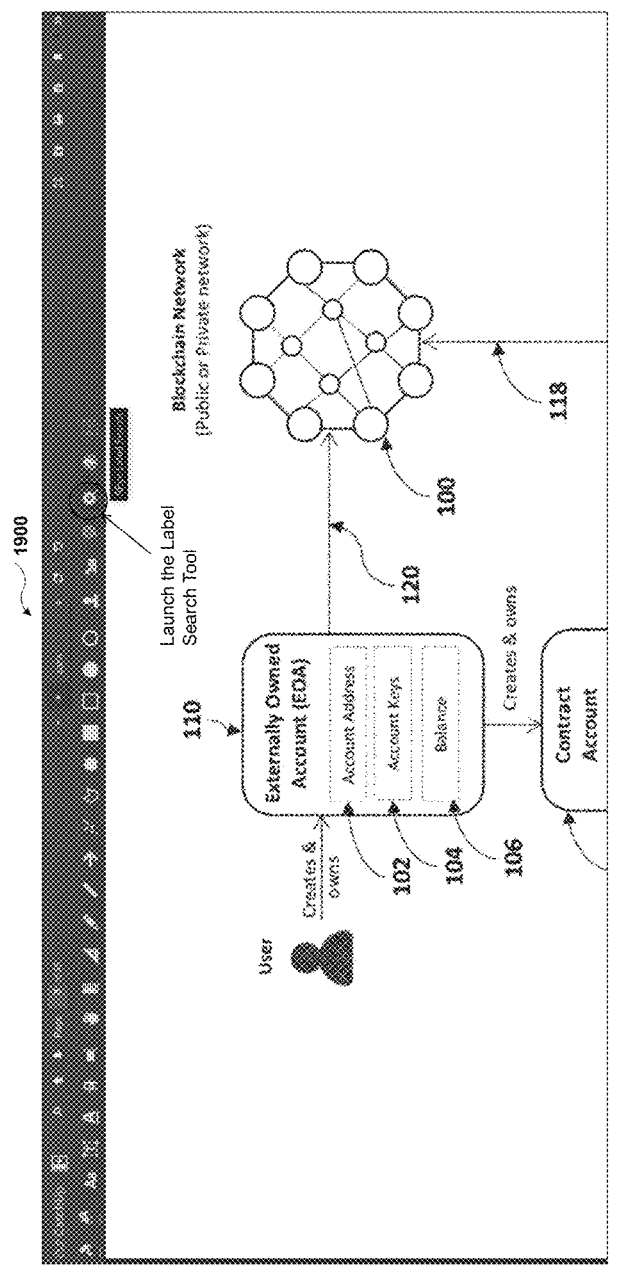
FIG. 20 is an exemplary interface of the CatchUp platform showing the PDF viewer (GlassViewer), according to an embodiment of the invention.

Referring now to FIG. 20 is an exemplary interface 1900 of the CatchUp platform showing the PDF viewer (GlassViewer), is described in more detail. GlassViewer is a PDF viewer application with CatchUp that allows annotating and commenting PDF files. The annotations and comments are stored in a separate layer which is rendered above the PDF document.

Figure 21:
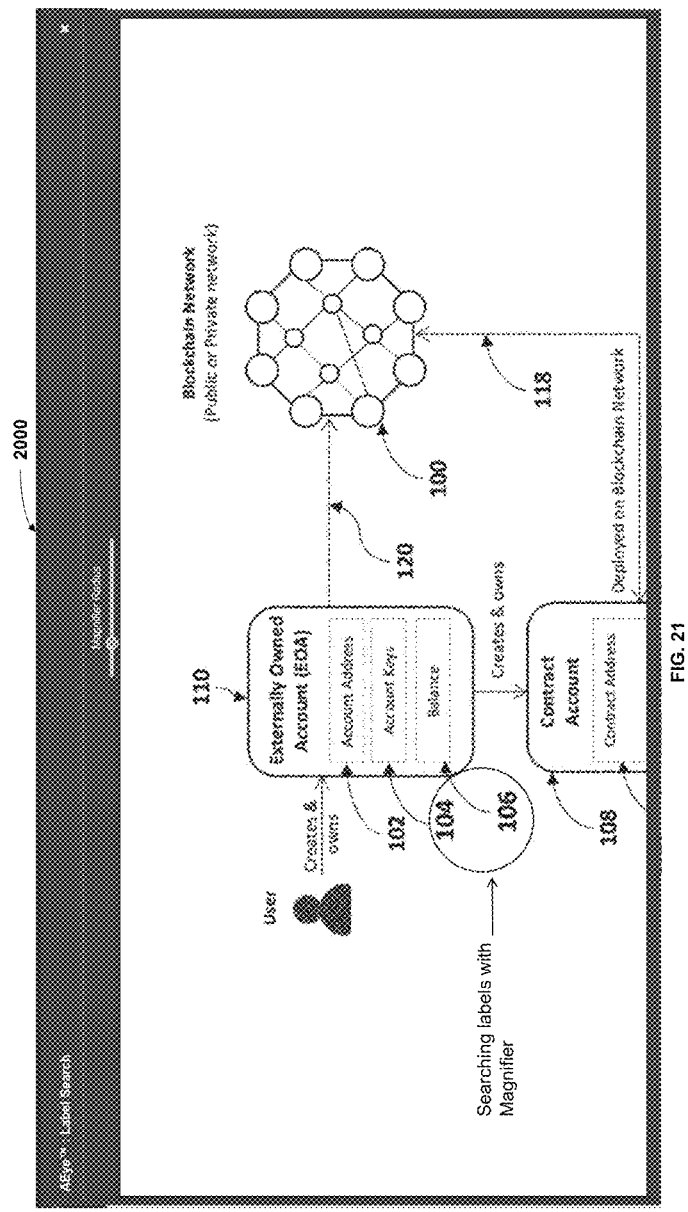
FIG. 21 is an exemplary interface of the CatchUp platform showing a magnifier tool within the GlassViewer for searching labels, according to an embodiment of the invention.

Referring now to FIG. 21 is an exemplary interface 2000 of the CatchUp platform showing a magnifier tool 2002 within the GlassViewer for searching labels, is described in more detail. GlassViewer includes a PDF label searching tool called AEye Label Searcher that allows quickly searching for all occurrences of selected labels within the PDF. AEye Label Searcher uses a magnifier to select specific labels within a region of the PDF which are sent to the AEye backend for processing, and the results are then displayed, which include excerpts from the document where the labels are mentioned. In some embodiments, the AEye backend may lookup labels within multiple documents or return additional information generated from one or more h-LLM models as taught elsewhere in other embodiments of this invention. For example, a legal brief may be first generated using a local (in-house) database of briefs and then supplemented by h-LLMs that are trained on public-domain training sets of legal briefs, and the combination may be merged as needed.

Figure 22:
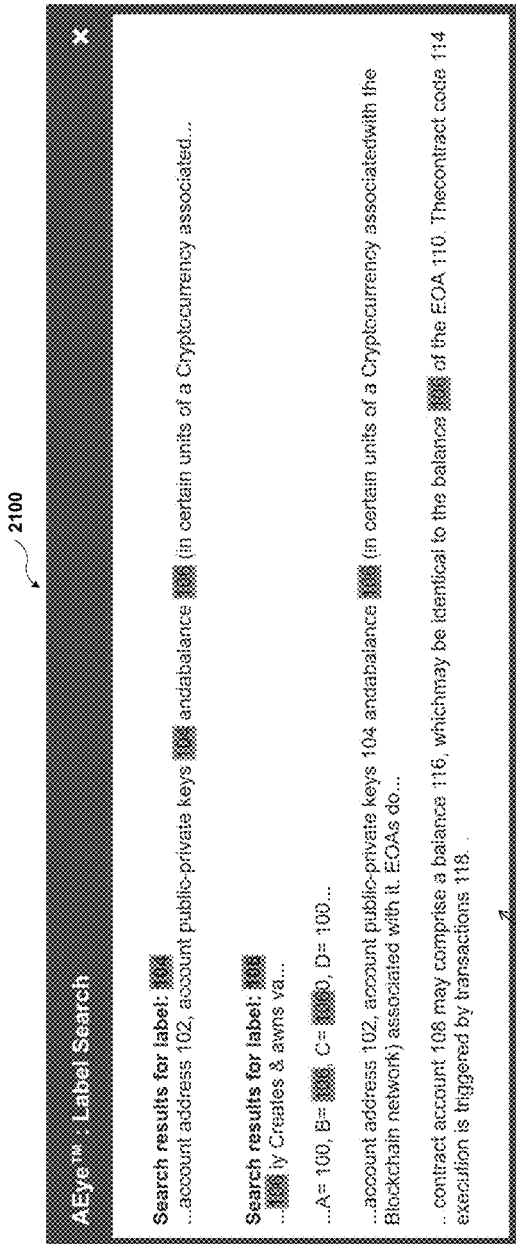
FIG. 22 is an exemplary interface of the CatchUp platform showing label search results within GlassViewer, according to an embodiment of the invention.

Referring now to FIG. 22 is an exemplary interface of the CatchUp platform showing label search results within GlassViewer, is described in more detail. The labels selected using the magnifier within the AEye Label Searcher are sent to the AEye backend for processing and the results are then displayed as shown in this figure.

Throughout the application, reference may be made to various computer hardware, including servers, GPUs, storage, cloud storage, and the like. It is contemplated and included within the scope of the invention that the CatchUp system and its various components may be software executed on computer devices, including servers, personal computers, smartphone devices, and the like, each comprising a processor configured to execute commands received from software (such as microprocessors, field-programmable gate arrays, integrated circuits, and the like), a non-transitory computer-readable storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described CatchUp functions includes hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for assigning tasks to LLMs using one or more families of large language models (h-LLMs) by a computer comprising of a processor, non-transitory storage medium, and software on the storage medium, the method comprising:
   receiving a received prompt at a user interface via an API;
   generating a plurality of derived prompts from the received prompt at an input broker based on one or more specialized tasks, each derived prompt of the plurality of derived prompts corresponding to at least one specialized task of the one or more specialized tasks and belonging to one or more categories;
   generating a plurality of prompt embeddings from the plurality of derived prompts by applying a plurality of embedding models;
   transmitting the plurality of prompt embeddings to a vector database, the vector database comprising a database of knowledge documents, each knowledge document comprised by the database of knowledge documents having one or more embeddings associated therewith;
   receiving one or more received knowledge documents from the vector database determined to be relevant to the plurality of prompt embeddings at the input broker;
   generating a plurality of context-aware prompts by the input broker responsive to at least one of the received prompt, the plurality of derived prompts, and the one or more received knowledge documents, each context-aware prompt of the plurality of context-aware prompts corresponding to a specialized task of the one or more specialized tasks;
   transmitting each context-aware prompt of the plurality of context-aware prompts to a respective h-LLM of a plurality of h-LLMs that is configured to specialize in processing prompts having a specialty corresponding to the specialized task of the context-aware prompt; and
   receiving a plurality of produced results from at least one of the plurality of h-LLMs by an output broker;
   wherein the plurality of h-LLMs operate as a network of communicating h-LLMs;
   wherein at least one of the received prompt or the plurality of produced results is processed and transmitted to another h-LLM of the plurality of h-LLMs in the network
   wherein at least one of the input broker and the output broker is configured to coordinate the plurality of context-aware prompts to be processed by a sequence of h-LLMs of the plurality of h-LLMs in response to at least one of the received prompt or the derived prompts.

2. The method of claim 1 wherein at least one of the input broker and the output broker are configured to coordinate the sequence of h-LLMs of the plurality of h-LLMs in response to each of workload, technical accuracy, and business value metrics of the plurality of h-LLMs.

3. The method of claim 1 wherein each h-LLM of the plurality of h-LLMs are configured to communicate at least one of the received prompt and the plurality of produced results to another h-LLM of the plurality of h-LLMs via one of the input broker and the output broker.

4. The method of claim 1 wherein each h-LLM of the plurality of h-LLMs communicates at least one of the received prompt and the plurality of produced results to another h-LLM of the plurality of h-LLMs sequentially responsive to receiving the at least one of the received prompt and the plurality of produced results from at least one of the input broker and the output broker.

5. The method of claim 1 wherein the network of communicating h-LLMs is organized in one of a serial structure, a parallel structure, or a hybrid structure.

6. The method of claim 1 wherein the output broker is further configured to:
   generate reviewed produced results by assigning at least one of a priority to each produced result and a weight to each produced result;
   generate filtered produced results by filtering the reviewed produced results;
   rank each filtered produced result; and
   cache each filtered produced result.

7. The method of claim 1 wherein:
   at least one of the input broker and the output broker is configured to update an index of derived prompts responsive to the plurality of produced results; and
   generating the plurality of derived prompts comprises identifying one or more derived prompts comprised by the index of derived prompts responsive to the received prompt.

8. The method of claim 1 wherein at least one of the input broker and the output broker comprises one or more LLMs.

9. The method of claim 1 wherein:
   each h-LLM of the plurality of h-LLMs is implemented as a microservice in one or more cloud container environments implemented using a Kubernetes environment and a service mesh, providing at least one containerized h-LLM microservice; and transmitting each context-aware prompt of the plurality of context-aware prompts to an h-LLM of the plurality of h-LLMs is performed via a cloud service API.

10. The method of claim 1 further comprising generating a new request responsive to the received prompt; wherein the plurality of derived prompts comprises the new request.

11. A system for assigning tasks to LLMs using one or more families of large language models (h-LLMs) comprising:
    a processor configured to:
        receive a received prompt at a user interface via an API;
        operate an input broker operable to:
            generate a plurality of derived prompts from the received prompt at the input broker based on one or more specialized tasks, each derived prompt of the plurality of derived prompts corresponding to at least one specialized task of the one or more specialized tasks and belonging to one or more categories;
            generate a plurality of prompt embeddings from the plurality of derived prompts by applying a plurality of embedding models;
            transmit the plurality of prompt embeddings to a vector database, the vector database comprising a database of knowledge documents, each knowledge document comprised by the database of knowledge documents having one or more embeddings associated therewith;
            receive one or more received knowledge documents from the vector database determined to be relevant to the plurality of prompt embeddings at the input broker;
            generate a plurality of context-aware prompts responsive to at least one of the received prompt, the plurality of derived prompts, and the one or more received knowledge documents, each context-aware prompt of the plurality of context-aware prompts corresponding to a specialized task of the one or more specialized tasks;
            transmit each context-aware prompt of the plurality of context-aware prompts to a respective h-LLM of a plurality of h-LLMs that is configured to specialize in processing prompts having a specialty corresponding to the specialized task of the context-aware prompt; and
        operate an output broker operable to receive a plurality of produced results from at least one of the plurality of h-LLMs-;
    a non-transitory storage medium; and
    software on the storage medium containing instructions that are executable by the processor;
    wherein the plurality of h-LLMs operate as a network of communicating h-LLMs;
    wherein at least one of the received prompt or the plurality of produced results is processed and transmitted to another h-LLM of the plurality of h-LLMs in the network;
    wherein the processor is configured to operate at least one of the input broker and the output broker to coordinate the plurality of context-aware prompts to be processed by a sequence of h-LLMs of the plurality of h-LLMs in response to at least one of the received prompt or the derived prompts.

12. The system of claim 11 wherein the processor is configured to operate at least one of the input broker and the output broker to coordinate the sequence of h-LLMs of the plurality of h-LLMs in response to each of workload, technical accuracy, and business value metrics of the plurality of h-LLMs.

13. The system of claim 11 wherein each h-LLM of the plurality of h-LLMs are configured to communicate at least one of the received prompt and the plurality of produced results to another h-LLM of the plurality of h-LLMs via one of the input broker and the output broker.

14. The system of claim 11 wherein each h-LLM of the plurality of h-LLMs communicates at least one of the received prompt and the plurality of produced results to another h-LLM of the plurality of h-LLMs sequentially responsive to receiving the at least one of the received prompt and the plurality of produced results from at least one of the input broker and the output broker.

15. The system of claim 11 wherein the network of communicating h-LLMs is organized in one of a serial structure, a parallel structure, or a hybrid structure.

16. The system of claim 11 wherein the processor is further configured to operate the output broker to:
    generate reviewed produced results by assigning at least one of a priority to each produced result and a weight to each produced result;
    generate filtered produced results by filtering the reviewed produced results;
    rank each filtered produced result; and
    cache each filtered produced result.

17. The system of claim 11 wherein the processor is configured to:
    operate at least one of the input broker and the output broker to update an index of derived prompts responsive to the plurality of produced results; and
    operate the input broker to generate the plurality of derived prompts by identifying one or more derived prompts comprised by the index of derived prompts responsive to the received prompt.

18. The system of claim 11 wherein the processor is configured to operate at least one of the input broker and the output broker to comprise one or more LLMs.

19. The system of claim 11 wherein:
    each h-LLM of the plurality of h-LLMs is implemented as a microservice in one or more cloud container environments using a Kubernetes environment and a service mesh, providing at least one containerized h-LLM microservice; and
    the processor is configured to transmit each context-aware prompt of the plurality of context-aware prompts to an h-LLM of the plurality of h-LLMs via a cloud service API.

20. The system of claim 11 wherein the processor is further configured to generate a new request responsive to the received prompt; wherein the plurality of derived prompts comprises the new request.

21. A system for assigning tasks to LLMs using one or more families of large language models (h-LLMs) comprising:
    means for receiving a received prompt at a user interface via an API;
    means for generating a plurality of derived prompts from the received prompt at an input broker based on one or more specialized tasks, each derived prompt of the plurality of derived prompts corresponding to least one specialized tasks of the one or more specialized tasks and belonging to one or more categories;
    means for generating a plurality of prompt embeddings from the plurality of derived prompts by applying a plurality of embedding models;

means for transmitting the plurality of prompt embeddings to a vector database, the vector database comprising a database of knowledge documents, each knowledge document comprised by the database of knowledge documents having one or more embeddings associated therewith;

means for receiving one or more received knowledge documents from the vector database determined to be relevant to the plurality of prompt embeddings at the input broker;

means for generating a plurality of context-aware prompts by the input broker responsive to at least one of the received prompt, the plurality of derived prompts, and the one or more received knowledge documents, each context-aware prompt of the plurality of context-aware prompts corresponding to a specialized task of the one or more specialized tasks;

means for transmitting each context-aware prompt of the plurality of context-aware prompts to a respective h-LLM of a plurality of h-LLMs that is configured to specialize in processing prompts having a specialty corresponding to the specialized task of the context-aware prompt; and means for receiving a plurality of produced results from at least one of the plurality of h-LLMs by an output broker;

wherein the plurality of h-LLMs operate as a network of communicating h-LLMs;

wherein at least one of the received prompt or the plurality of produced results is processed and transmitted to another h-LLM of the plurality of h-LLMs in the network;

wherein at least one of the input broker and the output broker is configured to coordinate the plurality of context-aware prompts to be processed by a sequence of h-LLMs of the plurality of h-LLMs in response to at least one of the received prompt or the derived prompts.

22. The system of claim 21 wherein at least one of the input broker and the output broker are configured to coordinate the sequence of h-LLMs of the plurality of h-LLMs in response each of workload, technical accuracy, and business value metrics of the plurality of h-LLMs.

23. The system of claim 21 wherein each h-LLM of the plurality of h-LLMs are configured to communicate at least one of the received prompt and the plurality of produced results to another h-LLM of the plurality of h-LLMs via one of the input broker and the output broker.

24. The system of claim 21 wherein each h-LLM of the plurality of h-LLMs communicates at least one of the received prompt and the plurality of produced results to another h-LLM of the plurality of h-LLMs sequentially responsive to receiving the at least one of the received prompt and the plurality of produced results from at least one of the input broker and the output broker.

25. The system of claim 21 wherein the network of communicating h-LLMs is organized in one of a serial structure, a parallel structure, or a hybrid structure.

26. The system of claim 21 wherein the output broker is further configured to:
generate reviewed produced results by assigning at least one of a priority to each produced result and a weight to each produced result;
generate filtered produced results by filtering the reviewed produced results;
rank each filtered produced result; and
cache each filtered produced result.

27. The system of claim 21 wherein:
at least one of the input broker and the output broker is configured to update an index of derived prompts responsive to the plurality of produced results; and
generating the plurality of derived prompts comprises identifying one or more derived prompts comprised by the index of derived prompts responsive to the received prompt.

28. The system of claim 21 wherein at least one of the input broker and the output broker comprises one or more LLMs.

29. The system of claim 21 wherein:
each h-LLM of the plurality of h-LLMs is implemented as a microservice in one or more cloud container environments implemented using a Kubernetes environment and a service mesh, providing at least one containerized h-LLM microservice; and
transmitting each context-aware prompt of the plurality of context-aware prompts to an h-LLM of the plurality of h-LLMs is performed via a cloud service API.

30. The system of claim 21 further comprising means for generating a new request responsive to the received prompt; wherein the plurality of derived prompts comprises the new request.

* * * * *

UNITED STATES PATENT AND TRADEMARK OFFICE
CERTIFICATE OF CORRECTION

| | | |
|---|---|---|
| PATENT NO. | : 12,321,370 B2 | Page 1 of 1 |
| APPLICATION NO. | : 18/801421 | |
| DATED | : June 3, 2025 | |
| INVENTOR(S) | : Vijay Madisetti and Arshdeep Bahga | |

It is certified that error appears in the above-identified patent and that said Letters Patent is hereby corrected as shown below:

In the Claims

Claim 21, Column 14, Lines 61-63:
"corresponding to least one specialized tasks" should be corrected to "corresponding to at least one specialized task"

Signed and Sealed this
Fifteenth Day of July, 2025

Coke Morgan Stewart
*Acting Director of the United States Patent and Trademark Office*